United States Patent
Holt

[15] 3,644,744
[45] Feb. 22, 1972

[54] WINDSCREEN WIPING SYSTEMS FOR ROAD VEHICLES

[72] Inventor: William David Holt, Colne, Lancashire, England

[73] Assignee: Joseph Lucas (Industries) Limited, Birmingham, England

[22] Filed: Mar. 23, 1970

[21] Appl. No.: 21,749

[30] Foreign Application Priority Data

May 27, 1969 Great Britain..................26,637/69

[52] U.S. Cl...........................................307/10, 15/250.17
[51] Int. Cl. .....................................................H02g 3/00
[58] Field of Search................15/250.13, 250.16, 250.17; 307/10; 318/DIG. 2

[56] References Cited

UNITED STATES PATENTS

| 2,987,747 | 6/1961 | Oishei et al. | 15/250.17 |
| 3,117,335 | 1/1964 | Oishei et al. | 15/250.17 X |
| 3,148,399 | 9/1964 | Ziegler | 15/250.17 X |

Primary Examiner—Herman J. Hohauser
Attorney—Holman & Stern

[57] ABSTRACT

A windshield wiping system has a wiper motor and a control switch for the motor, the control switch having an on position and an off position in serving when moved to its off position to reverse the flow of current to the wiper motor to cause the wiper motor to move the wipers clear of the windshield at which point a limit switch is tripped to stop the motor. In such a system, means is provided for effecting a delay between wipes so that the system operates more satisfactorily in light rain, and in addition a further limit switch is incorporated to ensure that the wipers park on the windshield when they are operating with the delay.

1 Claim, 5 Drawing Figures

WINDSCREEN WIPING SYSTEMS FOR ROAD VEHICLES

This invention relates to windscreen wiping systems for road vehicles, of the kind including a wiper motor, and a control switch for said motor, the control switch having an on position and an off position and serving when moved to its off position to reverse the flow of current to said wiper motor to cause said wiper motor to move the wipers clear of the windscreen of the vehicle, at which point a limit switch is tripped to stop the motor.

A system of the kind specified has the advantage that the wipers are not conspicuous when they are not in use. However, if such a system incorporates means for providing a delay between wipes, or between each of a succession of wipes, then the wipers will park off the screen during the delay period, which is clearly undesirable. The present invention seeks to overcome this difficulty.

According to the invention, in a windscreen wiper system of the kind specified, means is provided for operating the wipers with a delay between each wipe or after each of a succession of wipes, and a further limit switch is incorporated whereby the wipers park on the screen when they are operating with a delay.

Figure 1:
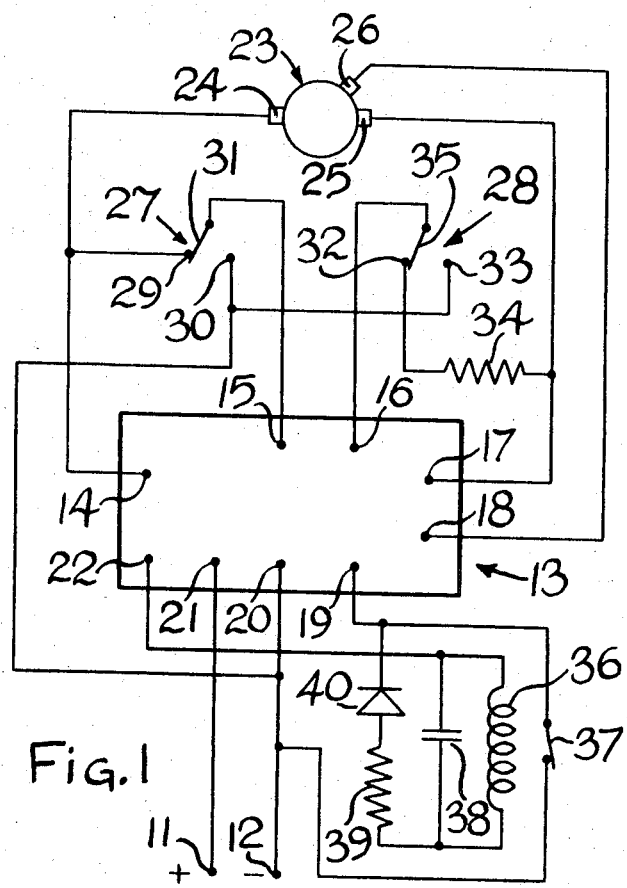

An example of the invention is illustrated in the accompanying drawings, in which FIG. 1 is a circuit diagram of the system, and FIGS. 2 to 5 respectively show four possible circuit connections within the control switch shown in FIG. 1.

Referring to FIG. 1, the system includes positive and negative terminals 11, 12 connected to the vehicle battery, and a manually operable control switch 13 having therein nine terminals labeled 14 to 22 inclusive. The system incorporates a permanent magnet windscreen wiper motor 23 having a pair of brushes 24, 25 which are energized to operate the motor at a slow speed, and a further brush 26 which together with the brush 24 is energized to operate the motor at a fast speed. The brush 24 is connected to the terminal 14, and the brushes 25 and 26 are connected respectively to the terminals 17 and 18. The system also incorporates a pair of limit switches 27 and 28, the switch 27 having fixed contacts 29 and 30 connected respectively to the terminals 14 and 12, and a movable contact 31 connected to the terminal 15. The switch 28 has fixed contacts 32 and 33, the contact 32 being connected to the terminal 17 through a resistor 34, and the contact 33 being connected to the terminal 12, and a movable contact 35 which is connected to the terminal 16.

The terminal 22 is connected to one end of the winding 36 of a relay having a normally closed contact 37. The winding 36 is bridged by a capacitor 38, and its other end is connected through a resistor 39 and a diode 40 in series to the terminal 19. The contact 37 is connected between the terminal 19 and the terminal 12.

Figure 2:
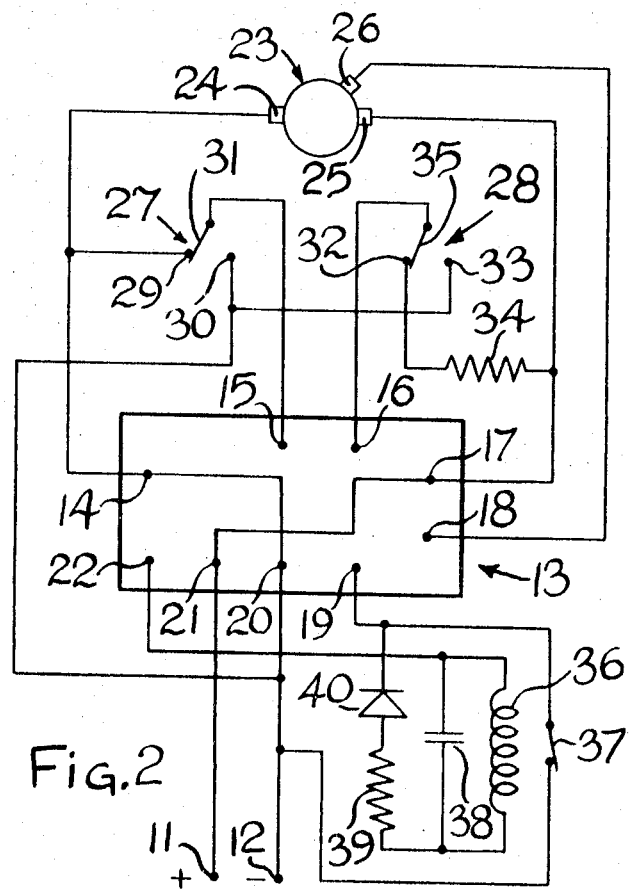

In order to understand the operation of the system, reference is now made to FIGS. 2 to 5, which show the connections within the control switch 13 in various conditions. Referring first to FIG. 2, when the wipers are to be operated at their slow speed, the switch 13 is moved to an operative position and connects the terminal 14 to the terminal 20 and the terminal 21 to the terminal 17. The brush 25 is now connected to the positive terminal and the brush 24 is connected to the negative terminal, so that the motor operates at its slow speed. During this operation, the limit switch 27 will have its contact 31 in engagement with the contact 30 permanently, and the limit switch 28 will have its contact 35 in engagement with the contact 33 except when the wipers reach the lowest point which they occupy during a wiping operation, at which point the contact 35 will move into engagement with the contact 32. However, both limit switches 27 and 35 are disconnected from the circuit at this stage, and so they play no part in the operation.

Figure 3:
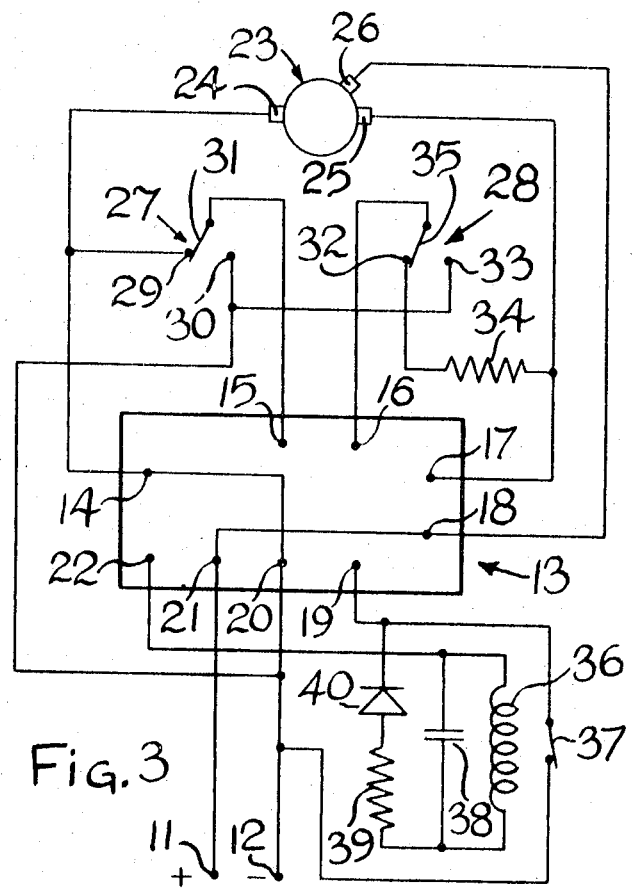

FIG. 3 illustrates the arrangement when the fast speed is selected. In this case the brush 24 is still connected to the negative terminal, but the brush 26 is connected to the positive terminal. The operation is exactly the same as in FIG. 2.

Figure 4:
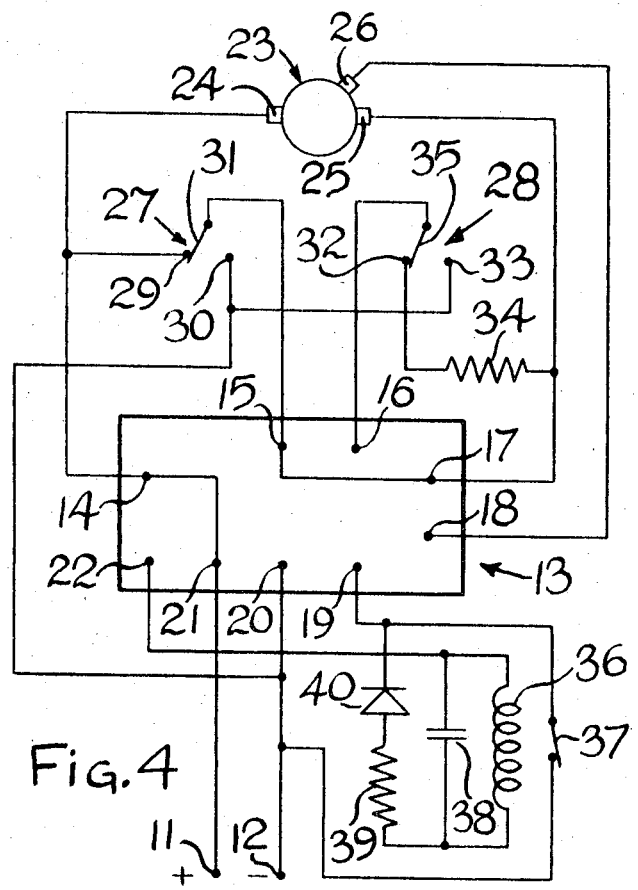

FIG. 4 illustrates the arrangement when the control switch is moved to its off position. It will be seen that the terminals 14 and 21 are interconnected, as are the terminals 15 and 17. In both the slow and fast running positions shown in FIGS. 2 and 3, the brush 24 was connected to the terminal 20, but in the off position shown in FIG. 4, the brush 24 is connected to the positive terminal. At the same time, the brush 25 is connected to the negative terminal by way of the terminals 17 and 15 and the contacts 31 and 30. Thus, whatever the position of the wipers on the screen at the moment when the switch 13 is moved to its off position, the motor 23 is reversed. The reversing action of the motor acts in known manner to cause the wipers to move off the windscreen of the vehicle. It has previously been explained with reference to FIG. 2 that the contact 31 remains in engagement with the contact 30, and this is true when the wipers are operating normally. However, as the wipers leave the windscreen the contact 31 moves out of engagement with the contact 30, so breaking the circuits to the motor. There will however be sufficient momentum in the motor to cause the contact 31 to move into engagement with the contact 29, at which point the brushes 24 and 25 are interconnected by way of the contacts 29 and 31 and the terminals 15 and 17, so that the motor is short circuited and stops. It will be appreciated that the parking action of the motor is the same whether the motor is operating at the slow or fast speeds.

Figure 5:
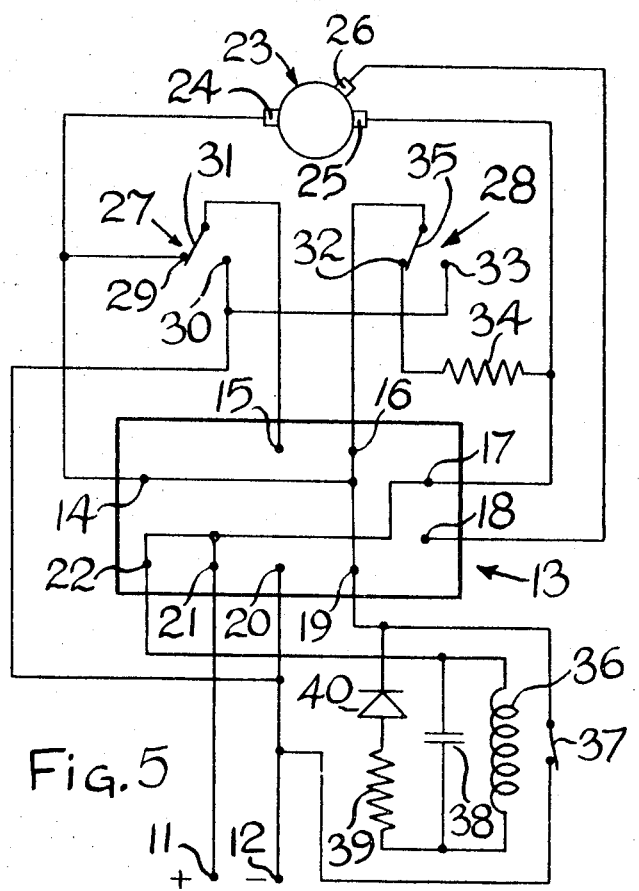

FIG. 5 illustrates the arrangement when the intermittent operation of the motor is selected, for example light rain. In this case the control switch 13 interconnects the terminals 14, 16 and 19, and the terminals 17, 21 and 22. It will be noted that no connections are now made to the limit switch 27. The brush 25 is now connected to the positive terminal 11 by way of the terminals 17 and 21, but the brush 24 is connected to the negative terminal 12 only by way of the contact 37. When the intermittent wipe condition is selected, a circuit is completed from the terminal 11 by way of terminals 21 and 17, the brushes 25 and 24, terminals 14 and 16 and contacts 35 and 33 to the terminal 12, so that the wiper motor starts to operate at the slow speed. The capacitor 38 is charged by way of the terminals 21 and 22 and as soon as it is charged the winding 36 is energized to open the contact 37. When the wipers reach the position previously referred to on the windscreen, the contact 35 moves into engagement with the contact 32 so connecting the resistor 34 across the brushes 24 and 25 and stopping the motor 23. Movement of the contact 35 into engagement with the contact 32 also disconnects the capacitor 38 from the terminals 11, 12, so that the capacitor 38 now discharges through the winding 36. While the capacitor 38 is discharging, the winding 36 is held energized and the contact 37 remains open, but when the capacitor 38 has discharged, the contact 37 closes again and completes an alternative path to the brushes 24 and 25, so that the wiper motor starts operating again. As soon as the wiper motor operates again, the capacitor 38 is charged and the winding 36 energized to open the contact 37, but by this time the contact 35 is reengaged with the contact 33 to keep the motor energized until the end of another cycle.

It will be appreciated that with the arrangement described, the wipers park off the screen when not in use, but when the intermittent delay is selected they can be parked at any convenient position on the screen. It will be apparent that other forms of delay mechanism may be used to obtain intermittent wipe.

Having thus described my invention what iI claim as new and desire to secure by Letters Patent is:

1. A windscreen wiping system for a road vehicle, including a wiper motor, a control switch for said motor, said control switch for said motor, said control switch having an on position and an off position, said control switch when in said on position operating said motor in one direction so that said wipers operate in a reciprocatory manner, and said control switch when in its off position reversing the flow of current to said wiper motor to cause said wiper motor to move the wipers clear of the windscreen of the vehicle, a first limit switch which is tripped to stop the motor when said wipers move clear of the windscreen of the vehicle, manually operable delay means serving to stop the wiper motor at the termination of a cycle of operation of said wipers and to recommence operation of said wiper motor after a delay, and a second limit switch operable by said manually operable delay means for parking said wipers on the screen when said manually operable delay means is operative in which means is provided for operating the wipers with a delay between each wipe or after a succession of wipes, and a further limit switch is incorporated whereby the wipers park on the screen when they are operating with a delay.

* * * * *